US011370376B2

(12) United States Patent
Deng et al.

(10) Patent No.: US 11,370,376 B2
(45) Date of Patent: Jun. 28, 2022

(54) DEPLOYABLE SEAT ARMREST

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 100 days.

(21) Appl. No.: 17/036,244

(22) Filed: Sep. 29, 2020

(65) Prior Publication Data
US 2022/0097638 A1 Mar. 31, 2022

(51) Int. Cl.
*B60N 2/75* (2018.01)
*B60R 21/02* (2006.01)
*B60N 2/427* (2006.01)
*B60N 2/02* (2006.01)

(52) U.S. Cl.
CPC ............ *B60R 21/02* (2013.01); *B60N 2/0276* (2013.01); *B60N 2/4279* (2013.01); *B60N 2/42727* (2013.01); *B60N 2/753* (2018.02); *B60R 2021/022* (2013.01); *B60R 2021/0273* (2013.01); *B60R 2021/0293* (2013.01)

(58) Field of Classification Search
CPC .............. B60R 21/02; B60R 2021/022; B60R 2021/0273; B60R 2021/0293; B60N 2/753; B60N 2/79; B60N 2/0276; B60N 2/4277; B60N 2/4279
See application file for complete search history.

(56) References Cited

U.S. PATENT DOCUMENTS

| 5,730,458 A * | 3/1998 | Byon .................... B60R 21/207 280/730.2 |
| 7,182,404 B2 | 2/2007 | Laurent |
| 8,534,759 B2 | 9/2013 | De La Garza et al. |
| 9,573,497 B2 * | 2/2017 | Jaradi .................. B60N 2/4207 |
| 9,783,155 B2 * | 10/2017 | Kondo .................. B60R 22/195 |
| 10,035,441 B1 * | 7/2018 | Patel .................. B60N 2/42727 |
| 11,110,881 B1 * | 9/2021 | Deng .................... B60R 21/207 |
| 2005/0200186 A1 * | 9/2005 | Schumacher .......... B60N 2/753 297/337 |
| 2019/0118755 A1 | 4/2019 | Dry et al. |

FOREIGN PATENT DOCUMENTS

FR 2961761 A1 12/2011

* cited by examiner

*Primary Examiner* — Philip F Gabler
(74) *Attorney, Agent, or Firm* — Frank A. MacKenzie; Bejin Bieneman PLC

(57) ABSTRACT

A seat includes a seatback and an armrest supported by the seatback. The armrest is rotatable relative to the seatback to a deployed position. A swing bar is supported by the armrest and is rotatable relative to the armrest to a downward position. The swing bar in the downward position is elongated downwardly from the armrest. A drive belt is indexed with the armrest and the swing bar to rotate the swing bar to the downward position when the armrests rotates to the deployed position.

20 Claims, 7 Drawing Sheets

DEPLOYABLE SEAT ARMREST

BACKGROUND

A vehicle may include components to restrain an occupant in a seat during a vehicle impact event. The component may be, for example, a seat belt, an airbag, an armrest, or any other suitable component. For example, an armrest may be mounted to the seat or to the floor adjacent the seat and may extend upwardly along the side of the seat such that the armrest may laterally restrain the occupant in the seat. Some vehicles may include a variety of different components that operate conjunctively with one another, or separately from one another.

DETAILED DESCRIPTION

Figure 1:
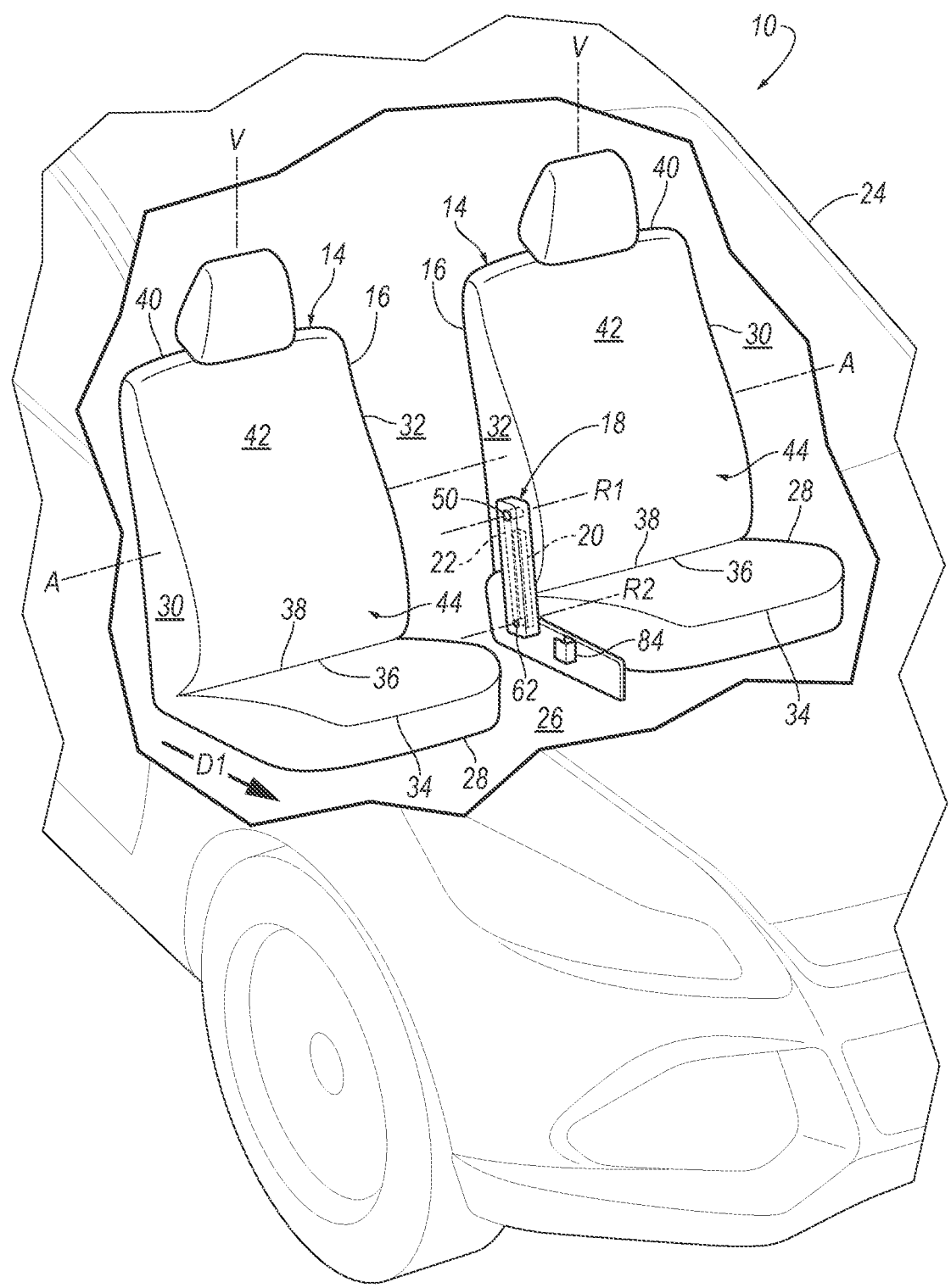
FIG. 1 is a perspective view of a vehicle including an armrest in an undeployed position.

A seat includes a seatback and an armrest supported by the seatback and rotatable relative to the seatback to a deployed position. A swing bar is supported by the armrest and rotatable relative to the armrest to a downward position. The swing bar in the downward position is elongated downwardly from the armrest. A drive belt is indexed with the armrest and the swing bar to rotate the swing bar to the downward position when the armrest rotates to the deployed position.

The seat may include a first gear fixed to the armrest and a second gear fixed to the swing bar. The drive belt may be toothed and may be engaged with the first gear and the second gear.

The drive belt may be endless and may extend around the first gear and the second gear.

The seat may include a pyrotechnic actuator supported by the seatback and engaged with the armrest. The pyrotechnic actuator may be configured to rotate the armrest to the deployed position.

The seat may include a first joint fixed to the armrest and a second joint fixed to the swing bar. The drive belt may be engaged with the first joint and the second joint.

The second joint may be spaced from the first joint along the armrest.

The armrest may be rotatable in a direction about the first joint. The swing bar may be rotatable in the direction about the second joint.

The drive belt may be endless and may extend around the first and second joints.

The seat may include a pyrotechnic actuator supported by the seatback and engaged with the armrest. The pyrotechnic actuator may be configured to rotate the armrest to the deployed position.

The seat may include a processor and a memory storing instructions to actuate the pyrotechnic actuator in response to detecting a vehicle impact.

The instructions may further include instructions to prevent actuation of the pyrotechnic actuator in response to detecting the armrest in the deployed position.

The swing bar may be housed in the armrest in a raised position.

The seat may include a seat bottom extending from the seatback. The swing bar in the downward position may extend from the armrest towards the seat bottom.

The seat bottom may include a bracket. The swing bar in the downward position may be engaged with the bracket.

The armrest may extend along the seatback in an undeployed position and transverse to the seatback in the deployed position.

The swing bar may extend along the armrest in a raised position when the armrest is in an undeployed position.

The seat may include a panel extending from the armrest to the swing bar.

The panel may be attached to the swing bar and the armrest. The panel may be under tension when the swing bar is in the downward position.

The panel may be uninflatable.

The panel may be fabric.

With reference to the Figures, wherein like numerals indicate like parts throughout the several views, a vehicle 10 is generally shown. The vehicle 10 includes a seat 14 including a seatback 16 and an armrest 18 supported by the seatback 16. The armrest 18 is rotatable relative to the seatback 16 to a deployed position. A swing bar 20 is supported by the armrest 18 and rotatable relative to the armrest 18 to a downward position. The swing bar 20 in the downward position is elongated downwardly from the armrest 18. A drive belt 22 is indexed with the armrest 18 and the swing bar 20 to rotate the swing bar 20 to the downward position when the armrest 18 rotates to the deployed position.

Figure 2:
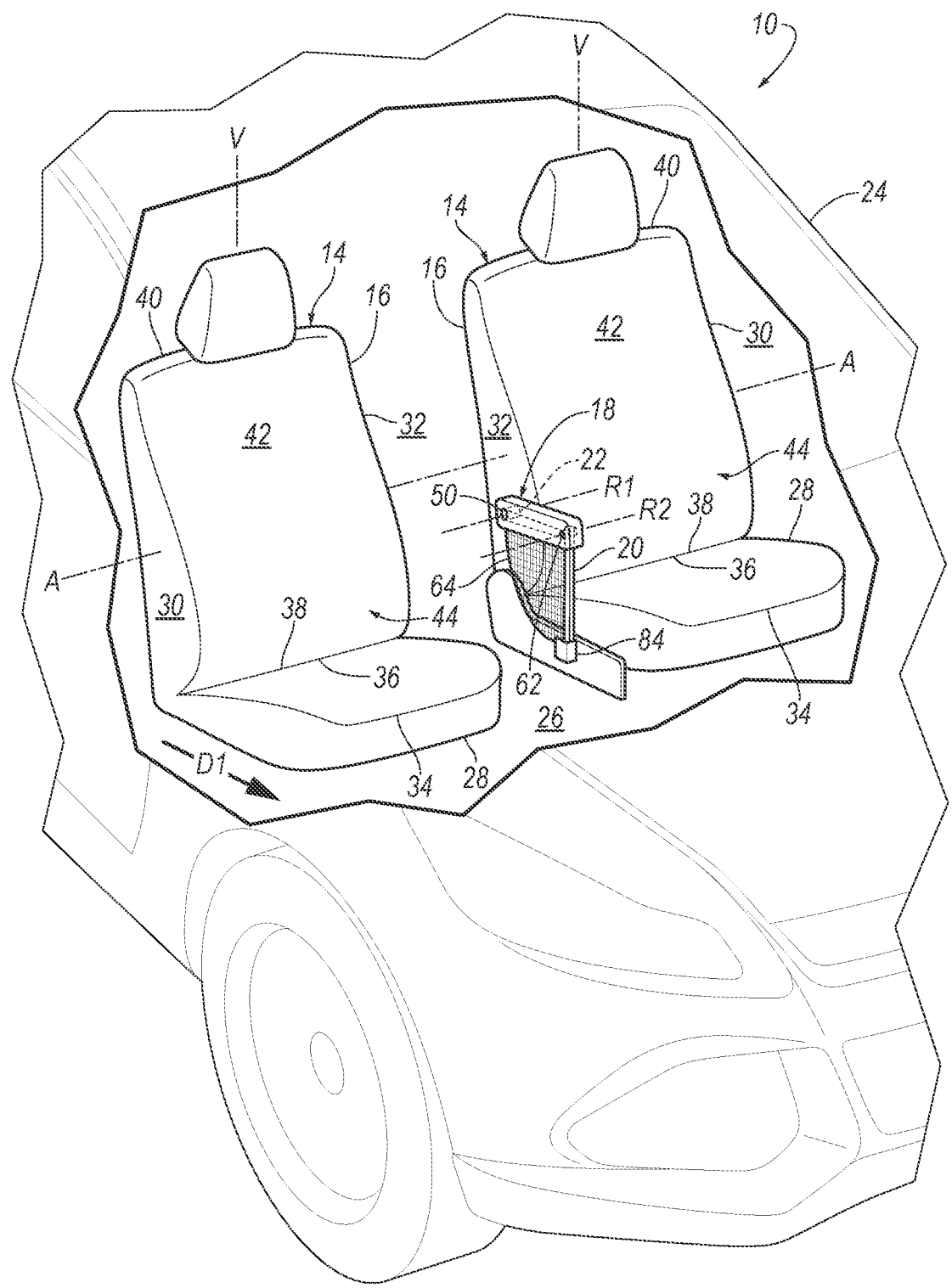
FIG. 2 is a perspective view of the vehicle including the armrest in a deployed position.
Figure 3:
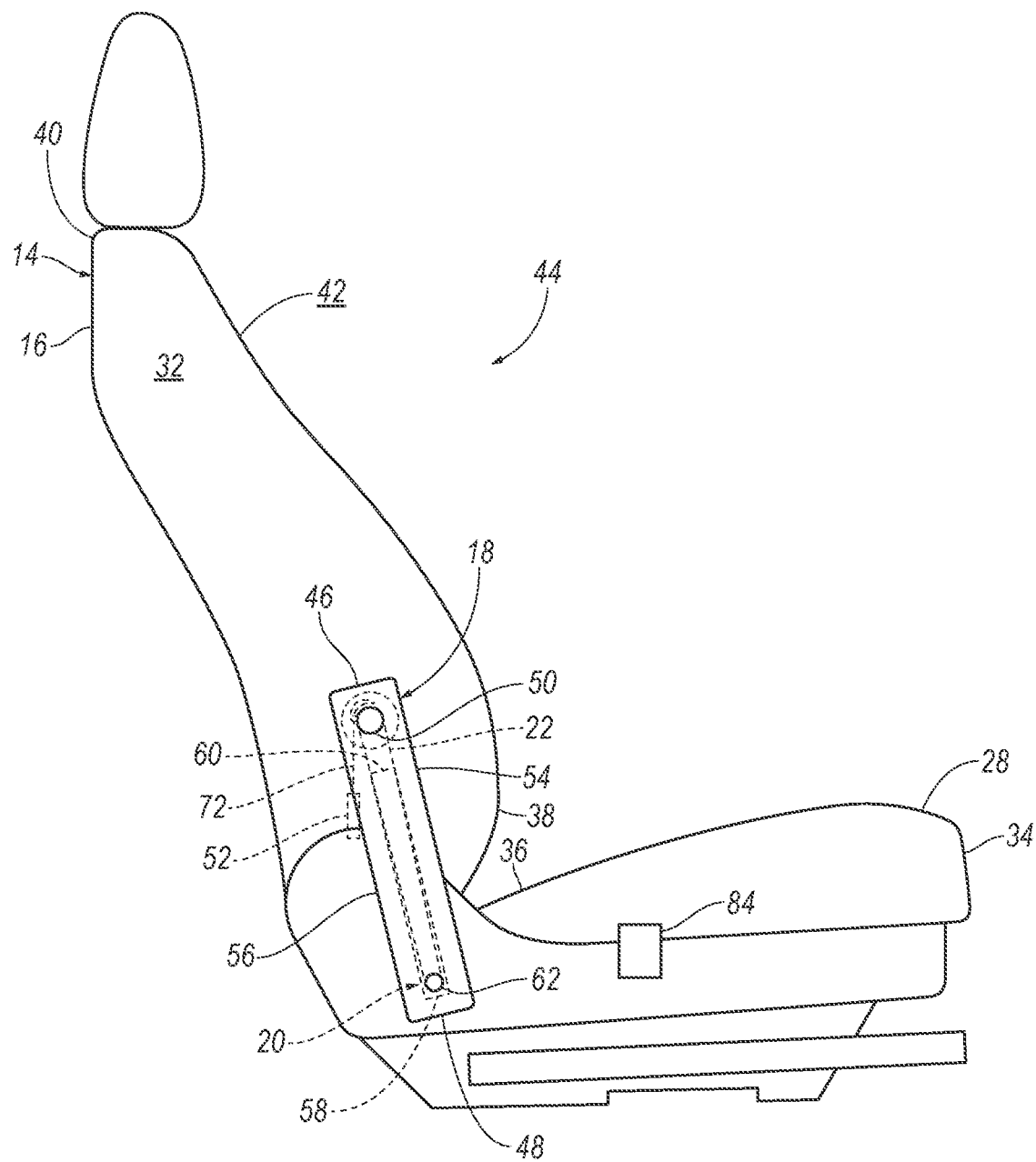
FIG. 3 is a side view of a seat including the armrest in the undeployed position and a swing bar in a raised position.
Figure 4:
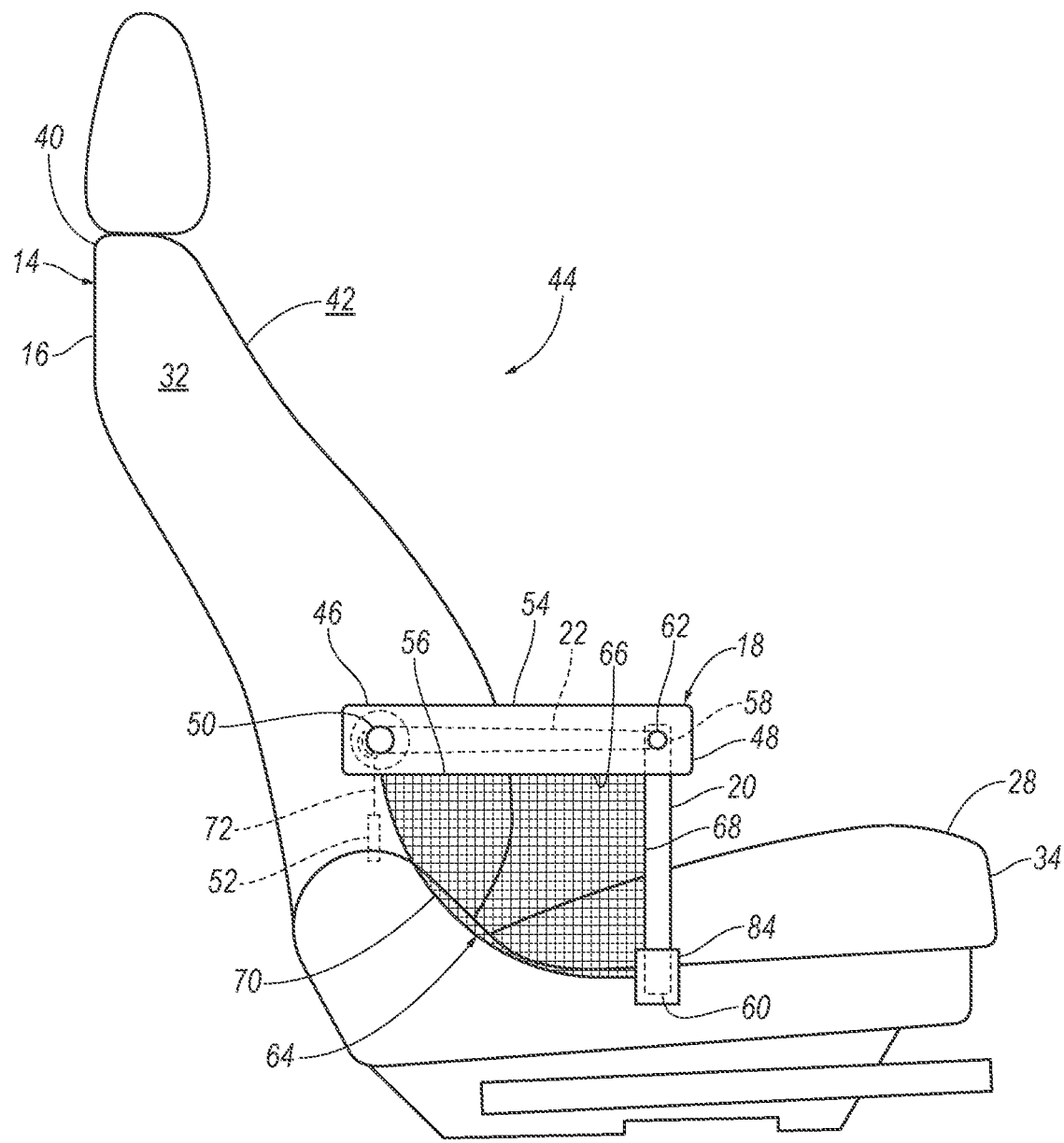
FIG. 4 is a side view of the seat including the armrest in the deployed position and the swing bar in a downward position.
Figure 5A:
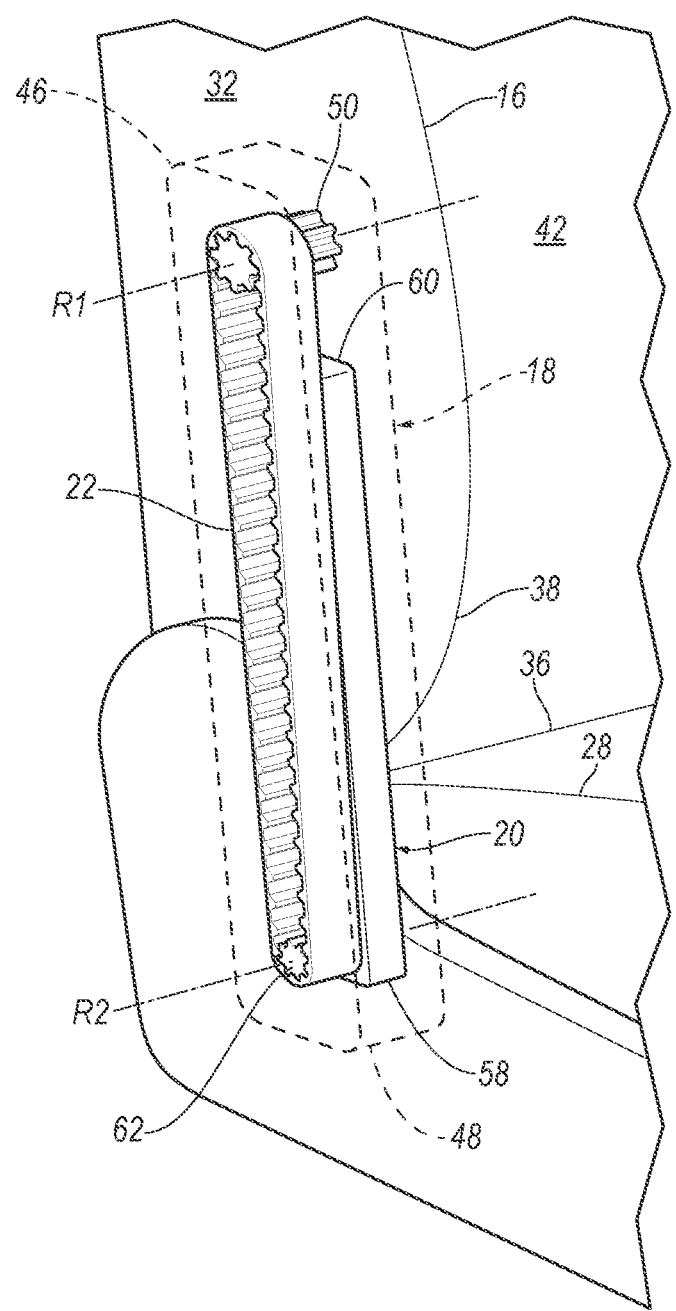
FIG. 5A is a magnified view of the armrest in the undeployed position and the swing bar in the raised position.
Figure 5B:
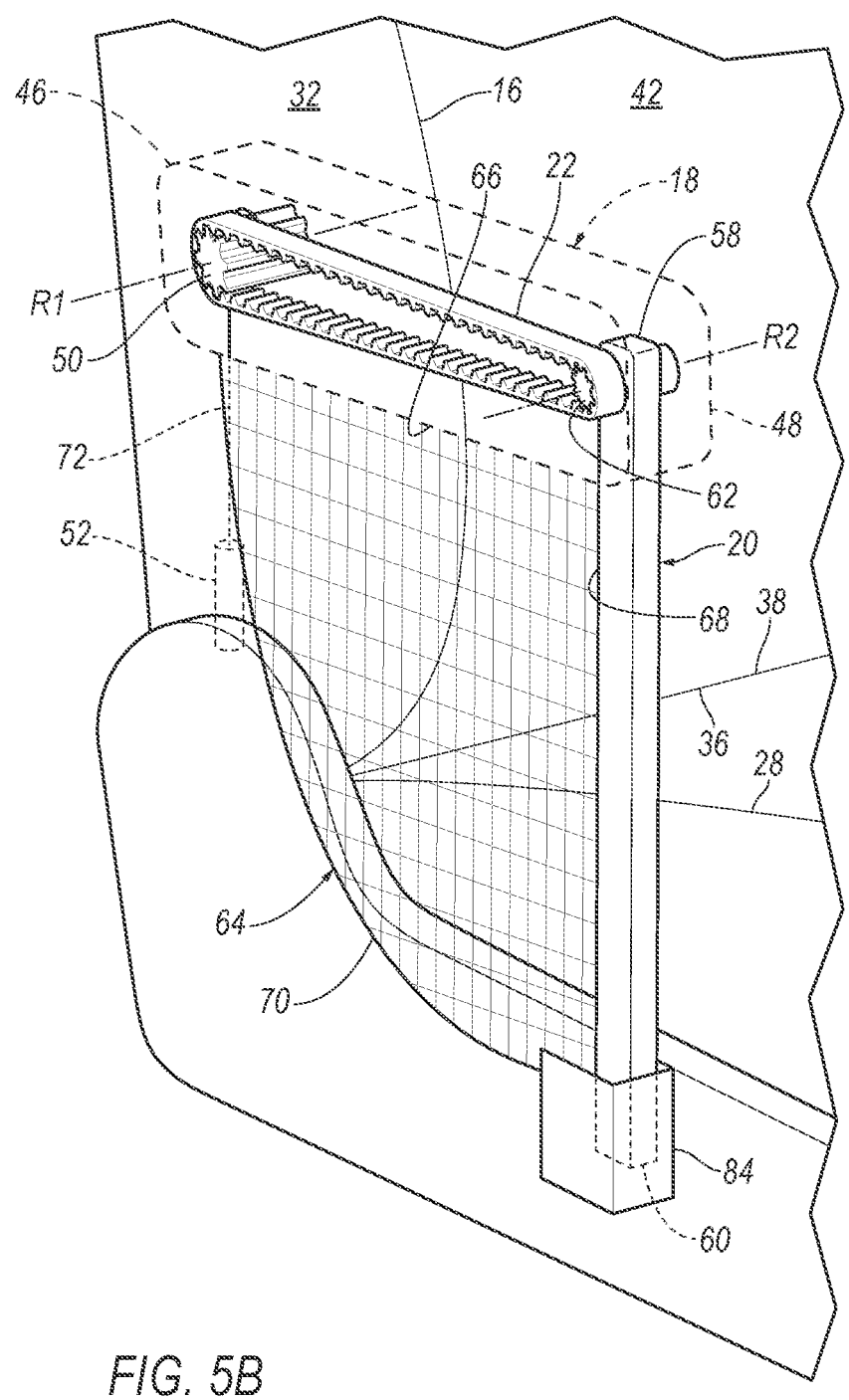
FIG. 5B is a magnified view of the armrest in the deployed position and the swing bar in the downward position.

The vehicle 10 may lack components, e.g., a center console, alongside the seat 14, e.g., to allow occupants to move within the vehicle 10. In other words, the vehicle 10 may lack a reaction surface alongside the seat 14 for an occupant. During a vehicle impact, the armrest 18 may be rotated from an undeployed position, as shown in FIGS. 1, 3, and 5A, to the deployed position, as shown in FIGS. 2, 4, and 5B, and the swing bar 20 may be rotated from a raised position, as shown in FIGS. 1, 3, and 5A, to the downward position, as shown in FIGS. 2, 4 and 5B. During the vehicle impact, an occupant of the seat 14 may be forced into the armrest 18 in the deployed position. The armrest 18 may control the kinematics of the occupant, e.g., a torso of the occupant. By rotating the swing bar 20 to the downward position when the armrest 18 rotates to the deployed position, the swing bar 20 may provide additional lateral support to the armrest 18, which may increase the likelihood that the armrest 18 controls the kinematics of the occupant regardless of whether another component is adjacent to the seat 14 to provide lateral support to the occupant.

With reference to FIGS. 1-2, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a body 24 defining a passenger cabin (not numbered) to house occupants, if any, of the vehicle 10. The body 24 may include a roof (not shown) and a floor 26 with the roof defining an upper boundary of the passenger cabin and the floor 26 defining a lower boundary of the passenger cabin. The body 24 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat.

With continued reference to FIGS. 1-2, each seat 14 may include a seatback 16 and a seat bottom 28. The seatback 16 may be supported by the seat bottom 28 and may be stationary or movable relative to the seat bottom 28. The seatback 16 and the seat bottom 28 may be adjustable in multiple degrees of freedom. Specifically, the seatback 16 and the seat bottom 28 may themselves be adjustable, in other words, adjustable components within the seatback 16 and/or the seat bottom 28 may be adjustable relative to each other.

Each seat 14 defines a lateral axis A and a vertical axis V transverse to the lateral axis A. Each seat 14 includes two sides 30, 32 spaced from each other along the lateral axis A. The sides 30, 32 extend along the seatback 16 and the seat bottom 28. The sides 30, 32 may support an occupant laterally relative to the seat 14. As one example, one of the sides 30, 32 may be an outboard side 30 and the other of the sides 30, 32 may be an inboard side 32 (with "inboard" and "outboard" referring to the relative position of the sides in a cross-vehicle direction). In such an example, the outboard side 30 is between the inboard side 32 of the seat 14 and the adjacent door.

As shown in the Figures, the seat bottom 28 includes a front end 34 and a back end 36. The seatback 16 is at the back end 36. The front end 34 is spaced from the back end 36 and the seatback 16. The seatback 16 extends across the seat bottom 28, e.g., from one side 30 of the seat 14 to the other side 32 of the seat 14, at the back end 36.

The seatback 16 includes a bottom 38 at the seat bottom 28 and a top 40 spaced from the bottom 38 and the seat bottom 28 along the vertical axis V of the seat 14. For example, the top 40 may support a head restraint (not numbered), i.e., be disposed between the head restraint and the seat bottom 28. The seatback 16 includes a front 42 that faces an occupant seating area 44 of the seat 14. The occupant seating area 44 is the area occupied by an occupant when seated on the seat bottom 28.

With reference to FIGS. 1-2, each seat 14 defines a seat-forward direction D1. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. As another example, the seat bottom 28 may extend from the seatback 16 in the seat-forward direction D1.

Each seat 14 is supported by the floor 26, as shown in FIGS. 1-2. Each seat 14 may slide relative to the floor 26, e.g., in the seat-forward direction D1 or a seat-backward direction. In such an example, the seat 14 may be supported on a seat track (not shown) to allow the seat 14 to move in the seat-forward direction D1 or the seat-backward direction. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 26. In this situation, the seat 14 may be immovable relative to the floor 26.

As set forth above, the armrest 18 is supported by the seat 14. For example, the armrest 18 may be mounted to the seatback 16, e.g., a frame of the seatback 16. The armrest 18 may present a class-A surface, e.g., a finished surface exposed to view by a customer and free of unaesthetic blemishes and defects.

The armrest 18 is rotatable relative to the seat 14 from the undeployed position to the deployed position. The armrest 18 may, for example, be rotated manually by the occupant between the undeployed position and the deployed position and may be rotated automatically to the deployed position in response to a vehicle impact, e.g., by a pyrotechnic actuator 52 as described below. In the undeployed position, the armrest 18 is elongated along the seatback 16, e.g., towards the seat bottom 28, as shown in FIG. 1. When the armrest 18 is in the undeployed position, the armrest 18 is rotatable in a first direction, e.g., counterclockwise, to the deployed position. In the deployed position, the armrest 18 extends transverse to the seatback 16, e.g., in the seat-forward direction D1, as shown in FIG. 2. In other words, the armrest 18 extends along the occupant seating area 44, i.e., along a side of the occupant, in the deployed position. When the armrest 18 is in the deployed position, the armrest 18 is rotatable in a second direction, e.g., clockwise, to the undeployed position. The second direction is opposite the first direction.

With reference to FIGS. 3-4, the armrest 18 may include a proximal end 46 and a distal end 48 spaced from the proximal end 46. The armrest 18 is elongated from the proximal end 46 to the distal end 48. In other words, the longest dimension of the armrest 18 is from the proximal end 46 to the distal end 48.

The proximal end 46 may be mounted to the seatback 16. For example, the armrest 18 may include a first joint 50 between the proximal end 46 and the seatback 16. The proximal end 46 meets the seatback 16 at the first joint 50. The first joint 50 is a rotatable joint. Specifically, the armrest 18 is rotatably connected to the seatback 16 at the first joint 50. The first joint 50 may, for example, be an axle, as shown in the Figures. In such an example, the axle may include teeth. That is, the axle may be a gear, as shown in FIGS. 5A-5B. Alternatively, the axle may be smooth. That is, the axle may be a pulley.

The first joint 50 defines a first rotational axis R1. The first rotational axis R1 is generally parallel to the lateral axis A of the seat 14, as shown in FIGS. 1-2. In this context, "generally" means that the first rotational axis R1 supports rotation of the armrest 18 along a side of the occupant even if the first rotational axis R1 deviates from parallel. The first joint 50 may be fixed to the armrest 18. That is, the first joint 50 and the armrest 18 may rotate as a unit about the first rotational axis R1.

Returning to FIGS. 3-4, the distal end 48 of the armrest 18 is spaced from the first joint 50, i.e., the first rotational axis R1. In other words, the distal end 48 is rotatable about the first rotational axis R1 between the undeployed position and the deployed position. When the armrest 18 is in the undeployed position, the distal end 48 of the armrest 18 is adjacent to the seatback 16, e.g., the bottom 38 of the seatback 16, as shown in FIG. 3. When the armrest 18 is in the deployed position, the distal end 48 is spaced from the seatback 16, e.g., disposed between the front end 34 and the back end 36 of the seat bottom 28, as shown in FIG. 4.

The armrest 18 includes a top 54 and a bottom 56 spaced from the top 54. The top 54 and the bottom 56 are each elongated from the proximal end 46 to the distal end 48 of the armrest 18. The armrest 18 includes a channel (not shown) extending from the bottom 56 towards the top 54. The channel is spaced from the top 54. The channel faces, i.e., is open to, the floor 26 when the armrest 18 is in the deployed position. The channel is designed, i.e., sized and shaped, to receive the swing bar 20. The first joint 50 extends into the channel of the armrest 18.

The swing bar 20 is rotatable relative to the armrest 18 from the raised position to the downward position, as set forth above. As the armrest 18 rotates to the deployed position, the swing bar 20 rotates to the downward position. That is, rotation of the armrest 18 causes the swing bar 20 to rotate to the downward position. In the raised position, the swing bar 20 is elongated along the armrest 18, as shown in FIG. 3. In the raised position, the swing bar 20 is housed in the armrest 18, i.e., disposed in the channel. When the swing bar 20 is in the raised position, the swing bar 20 is rotatable in the first direction, e.g., counterclockwise, to the downward position. In the downward position, the swing bar 20 extends transverse to the armrest 18, as shown in FIG. 4. For example, the swing bar 20 may extend from the armrest 18 towards the seat bottom 28, e.g., generally along the vertical axis V of the seat 14, in the downward position. When the swing bar 20 is in the downward position, the swing bar 20 is rotatable in the second direction, e.g., clockwise, to the raised position.

With continued reference to FIGS. 3-4, the swing bar 20 may include a first end 58 and a second end 60 spaced from the first end 58. The swing bar 20 is elongated from the first end 58 to the second end 60. In other words, the longest dimension of the swing bar 20 is from the first end 58 to the second end 60. The swing bar 20 is shorter than the armrest 18. That is, the ends 58, 60 of the swing bar 20 are closer together than the ends 46, 48 of the armrest 18.

The first end 58 of the swing bar 20 is housed in the armrest 18, e.g., in the channel. The first end 58 of the swing bar 20 is mounted to the armrest 18. For example, the swing bar 20 may include a second joint 62 between the first end 58 of the swing bar 20 and the armrest 18. The armrest 18 meets the first end 58 of the swing bar 20 at the second joint 62. The second joint 62 is a rotatable joint. Specifically, the swing bar 20 is rotatably connected to the armrest 18 at the second joint 62. The second joint 62 may be a same type of rotatable joint as the first joint 50, e.g., an axle, such as a gear or pulley.

The second joint 62 defines a second rotational axis R2. The second rotational axis R2 is generally parallel to the first rotational axis R1, as shown in FIGS. 1-2. The second joint 62 may be fixed to the swing bar 20. That is, the second joint 62 and the swing bar 20 may rotate as a unit about the second rotational axis R2.

Returning to FIGS. 3-4, the second joint 62 is spaced from the first joint 50 along the armrest 18. That is, the first rotational axis R1 is spaced from the second rotational axis R2 along the armrest 18. For example, the second joint 62 may be at the distal end 48 of the armrest 18. That is, the first end 58 of the swing bar 20 may be at the distal end 48 of the armrest 18. As another example, the second joint 62 may be disposed between the proximal end 46 and the distal end 48 of the armrest 18. That is, the first end 58 of the swing bar 20 may be between the proximal end 46 and the distal end 48 of the armrest 18.

The second end 60 of the swing bar 20 is spaced from the second joint 62, i.e., the second rotational axis R2. In other words, the second end 60 of the swing bar 20 is rotatable about the second rotational axis R2. When the swing bar 20 is in the raised position, the second end 60 of the swing bar 20 is disposed in the armrest 18, i.e., between the proximal and distal ends 46, 48 of the armrest 18. When the swing bar 20 is in the downward position, the second end 60 of the swing bar 20 is spaced from the armrest 18, e.g., along the vertical axis V of the seat 14.

With continued reference to FIGS. 3-4, the swing bar 20 and the seat 14 may lock with each other in a fixed position when the swing bar 20 is in the downward position. For example, the seat 14 may include a bracket 84 that engages the swing bar 20 in the downward position. That is, the swing bar 20 extends from the armrest 18 to the bracket 84 in the downward position, as shown in FIG. 4. The bracket 84 may be fixed to the seat bottom 28, e.g., between the front end 34 and the back end 36 of the seat bottom 28. The bracket 84 may extend inboard of the seat bottom 28, e.g., along the lateral axis A of the seat 14. The bracket 84 may include a first side (not numbered) extending along the seat bottom 28, a second side (not numbered) spaced from the seat bottom 28, and a third side (not numbered) extending from the first side to the second side along the lateral axis A of the seat 14. In other words, the bracket 84 may have a U-shape in cross-section along the lateral axis A of the seat 14.

The bracket 84 and the swing bar 20 are selectively engageable with each other from an unlocked position to a locked position. In the unlocked position, the bracket 84 and the swing bar 20 are spaced from each other, i.e., not engaged with each other. In this situation, the swing bar 20 is rotatable relative to the armrest 18, e.g., during deployment. In the locked position, the bracket 84 and the swing bar 20 are engaged with each other, i.e., fixed relative to each other, as shown in FIG. 4. For example, the swing bar 20 may be partially disposed in the bracket 84, e.g., between the first and second sides of the bracket 84 and abutting the third side of the bracket 84, when the swing bar 20 is in the downward position. In other words, the bracket 84 prevents the swing bar 20 from moving relative to the armrest 18. Said differently, the swing bar 20 and the seat 14 are locked with each other in the fixed position when the swing bar 20 is in the downward position. By locking the swing bar 20 and the seat 14 in the fixed position, the swing bar 20 may provide additional lateral support to the occupant during a vehicle impact.

The drive belt 22 is disposed in the armrest 18, as set forth above. For example, the drive belt 22 may be disposed in the channel of the armrest 18. The drive belt 22 may be endless and extend around the first joint 50 and the second joint 62, as shown in FIGS. 5A-5B. That is, the drive belt 22 may extend continuously along the armrest 18 and around the first and second joints 50, 62.

The drive belt 22 is indexed with the armrest 18 and the swing bar 20, as shown in FIGS. 5A-5B. In other words, the position of the swing bar 20 is based on the position of the armrest 18 as controlled by the engagement of the drive belt 22 with the armrest 18 and the swing bar 20. Movement of the armrest 18 results in a predetermined movement of the swing bar 20 due to the engagement of the drive belt 22 with the armrest 18 and the swing bar 20. For example, the drive belt 22 may be indexed with the first joint 50 and the second joint 62. In other words, the drive belt 22 may be operatively connected to the first and second joint 50, 62. Specifically, the drive belt 22 transmits rotation between armrest 18, e.g., the first joint 50, and the swing bar 20, e.g., the second joint 62. For example, as the armrest 18 rotates in the first direction about the first joint 50 to the deployed position, the first joint 50 rotates the drive belt 22, thus causing the drive belt 22 to rotate the second joint 62 and the swing bar 20 in the first direction to the downward position. Additionally, as the armrest 18 rotates in the second direction about the first joint 50 to the undeployed position, the first joint 50 rotates the drive belt 22, thus causing the drive belt 22 to rotate the second joint 62 and the swing bar 20 in the second direction to the raised position.

The drive belt 22 may be of any suitable type for transmitting rotation from the first joint 50 to the second joint 62. For example, when the first and second joints 50, 62 are gears, the drive belt 22 may be toothed, as shown in FIGS. 5A-5B. That is, the drive belt 22 may be designed to, i.e., sized, shaped, and spaced, to engage teeth on the gears 50, 62 to transmit rotation between the gears 50, 62. As another example, when the first and second joints 50, 62 are pulleys, the drive belt 22 may frictionally engage the pulleys 50, 62 to transmit rotation between the pulleys 50, 62. The drive belt 22 may be any suitable material, e.g., a flexible fiber-reinforced polymer, metal, etc.

A panel 64 may extend from the armrest 18 to the swing bar 20, as shown in FIGS. 2, 4, and 5B. The panel 64 may be attached to the armrest 18 and the swing bar 20, e.g., via stitching, ultrasonic welding, etc. The panel 64 may be uninflatable. In other words, the panel 64 may not define an inflation chamber, e.g., the panel 64 may be a panel of material that is not fixed to another panel, or itself, to enclose a volume for receiving inflation medium.

With reference to FIGS. 4 and 5B, the panel 64 may include a first side 66 extending along the armrest 18. The first side 66 may extend from the proximal end 46 of the armrest 18 towards the distal end 48 of the armrest 18. The first side 66 may extend any suitable amount towards the distal end 48 of the armrest 18. For example, the first side 66 may extend to the distal end 48, e.g., to the swing bar 20. Alternatively, the first side 66 may be spaced from the distal end 48 of the armrest 18. The panel 64 may be attached to the armrest 18 along the first side 66.

With continued reference to FIGS. 4 and 5B, the panel 64 may include a second side 68 extending along the swing bar 20. In other words, the second side 68 extends transverse to the first side 66 when the armrest 18 is in the deployed position. The second side 68 may extend from the armrest 18 towards the second end 60 of the swing bar 20. The second side 68 may extend any suitable amount towards the second end 60 of the swing bar 20. For example, the second side 68 may extend to the second end 60 of the swing bar 20. Alternatively, the second side 68 may be spaced from the second end 60 of the swing bar 20. The panel 64 may be attached to the swing bar 20 along the second side 68.

With continued reference to FIGS. 4 and 5B, the panel 64 may include a third side 70 extending from the first side 66 to the second side 68. In other words, the third side 70 extends transverse to both the first side 66 and the second side 68. The third side of the panel 64 is movable relative to the first and second sides 66, 68 of the panel 64. For example, the third side 70 may move about the second rotational axis R2 during deployment of the swing bar 20. That is, the swing bar 20 may pull the third side 70 as the swing bar 20 rotates to the downward position.

The panel 64 may be under tension when the swing bar 20 is in the downward position. In other words, the panel 64 may be taught, i.e., not relaxed, when the swing bar 20 is in the downward position. By tensioning the panel 64, the panel 64 may provide additional lateral support for the armrest 18, which may assist the armrest 18 in controlling occupant kinematics.

The panel may define a cavity (not shown). For example, the panel 64 may be folded along the third side 70. In such an example, the panel 64 includes an outboard face and an inboard face. The outboard face of the panel 64 may be connected to the armrest 18 and the swing bar 20 along the first and second sides 66, 68, respectively. The inboard face may be attached to the swing bar 20 along the second side 68 and may be free from the armrest 18 along the first side 66. That is, the first side 66 of the inboard face may be movable, e.g., by the occupant, relative to the first side 66 of the outboard face of the panel 64, e.g., to store objects between the inboard and outboard face of the panel 64.

The panel 64 may, for example be a single continuous unit, e.g., a single piece of fabric. As another example, the panel 64 may be a net, as shown in FIGS. 2, 4 and 5B. That is, the panel 64 may include a plurality of cords (not numbered) arranged in a grid like pattern. The grid like pattern may extend from the armrest 18 to the swing bar 20. The cords may be spaced closely enough to hold down objects typically stored in the passenger cabin; for example, the cords may be two or three times closer together than a dimension of a smallest of typical objects stored in the passenger cabin, e.g., a mobile phone. The cords may be of any suitably flexible material with a suitably high tensile strength, e.g., nylon. In another example, the panel may be a mesh, a woven fabric panel, etc.

The pyrotechnic actuator 52 (as mentioned above) may be supported by the seatback 16. For example, the pyrotechnic actuator 52 may be mounted to the seatback 16, e.g., a frame of the seatback 16. The pyrotechnic actuator 52 is operable to pull the armrest 18 to the deployed position, i.e., to rotate the armrest 18 about the first rotational axis R1. For example, the pyrotechnic actuator 52 may be connected to the proximal end 46 of the armrest 18. As another example, the pyrotechnic actuator 52 may be connected to the first joint 50. As an example, a tether 72 may extend from the pyrotechnic actuator 52 to one of the proximal end 46 of the armrest 18 or the first joint 50, as shown in FIGS. 3, 4 and 5B. The tether 72 may be connected to the proximal end 46 of the armrest 18 or the first joint 50. As another example, the tether 72 may be a cable. As yet another example, the tether 72 may be a rigid bar.

The pyrotechnic actuator 52 is configured to pull the armrest 18 to the deployed position. Specifically, the pyrotechnic actuator 52 rotates the armrest 18 about the first rotational axis R1 to the deployed position. The pyrotechnic actuator 52 is actuated in response to a vehicle impact, as discussed below. Since the pyrotechnic actuator 52 is connected to the proximal end 46 of the armrest 18 or the first joint 50 by the tether 72, the pyrotechnic actuator 52 pulls the tether 72 upon actuation, which rotates the armrest 18 about the first rotational axis R1, as shown in FIGS. 4B and 5B. The pyrotechnic actuator 52 may linearly retract the tether 72. The pyrotechnic actuator 52 is configured to pull the proximal end 46 of the armrest 18 toward the seat bottom 28. When the pyrotechnic actuator 52 retracts the tether 72, the tether 72 pulls the proximal end 46 and rotates the armrest 18 about the first rotational axis R1.

The pyrotechnic actuator 52 in FIGS. 3, 4 and 5B is pyrotechnically actuated. The pyrotechnic actuator 52 may be any actuator that ignites a combustible material. For example, the pyrotechnic actuator 52 may include a pyrotechnic charge that produces gas or otherwise rapidly expands upon actuation. Specifically, the pyrotechnic actuator 52 may include a cylinder and a piston and pyrotechnic charge in the cylinder. The piston is connected to the tether 72 and the pyrotechnic charge is ignited to slide the piston along the cylinder, i.e., moving the piston and the tether 72 relative to the seatback 16. In response to a vehicle impact, as discussed further below, the pyrotechnic charge detonates to move the piston.

Figure 6:
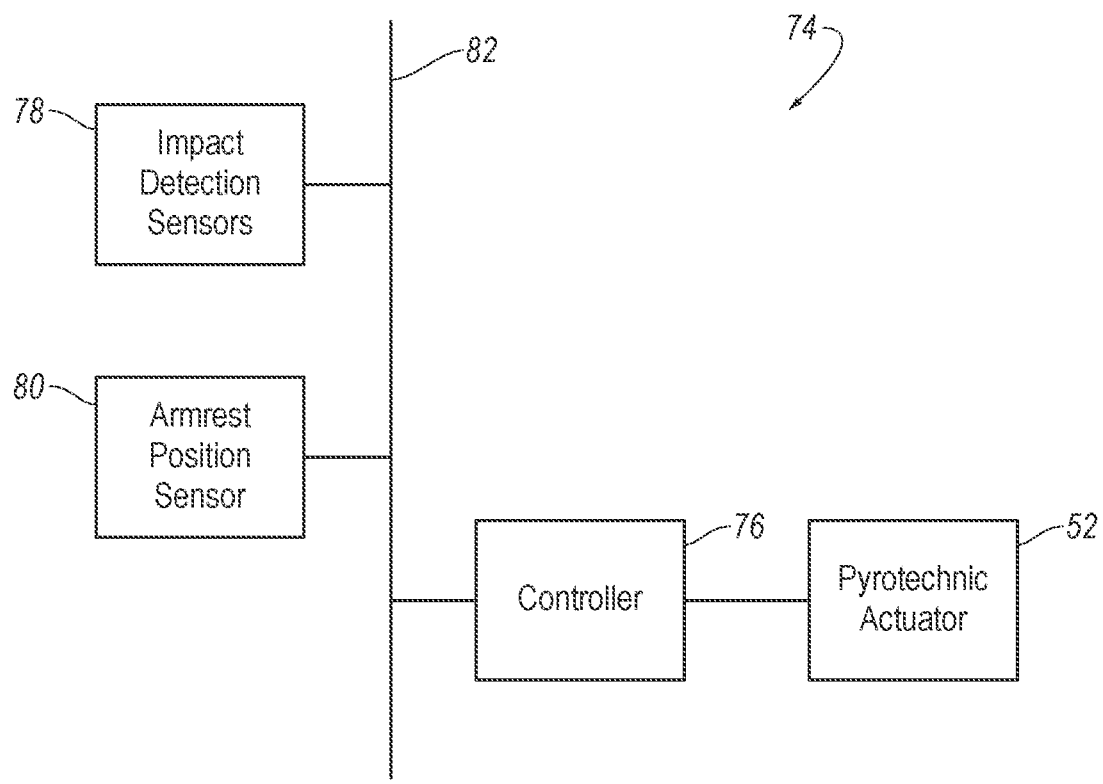
FIG. 6 is a block diagram of a control system of the vehicle.

With reference to FIG. 6, the vehicle 10 may include a control system 74. The control system 74 may include the controller 76, an impact detection sensor 78, an armrest position sensor 80 and the pyrotechnic actuator 52, in communication through a communication network 82.

The armrest position sensor 80 may be in communication with the controller 76. The armrest position sensor 80 is programmed to detect a position of the armrest 18. The control system 74 may include any suitable number of armrest position sensors 80, e.g., one armrest position sensor 80 for each armrest 18. The armrest position sensor 80 may be mounted to any suitable component of the vehicle 10, e.g., the armrest 18, the seatback 16, etc. The armrest position sensors 80 may be any suitable sensor in the armrest 18 (e.g., rotary encoders, Hall-effect sensors, etc.) or exterior to the armrest 18 (including cameras, image sensors, etc.). The controller 76 may receive one or more signals from the armrest position sensors 80 indicating the position of the armrest 18, e.g., the deployed position or the undeployed position.

The impact detection sensor 78 may be in communication with the controller 76. The impact detection sensor 78 is programmed to detect an impact to the vehicle 10. The impact detection sensors 78 may be of various types, e.g., pressure sensor, acceleration sensor, vision sensor, etc. The impact detection sensor 78 may be located at numerous points in or on the vehicle 10. When the vehicle impact occurs, the controller 76 may receive one or more signals from the impact detection sensors 78 indicating the vehicle impact.

The controller 76 may be a microprocessor-based computing device implemented via circuits, chips, or other electronic components. The controller 76 may include a processor, memory, etc. The memory of the controller 76 may store instructions executable by the processor and the processor may read the instructions from the memory and execute the instructions.

The control system 74 may transmit signals through the communications network 82 such as a controller area network (CAN) bus, Ethernet, Local Interconnect Network (LIN), and/or by any other wired or wireless communications network.

The controller 76 may be programmed to actuate the pyrotechnic actuator 52 in response to detecting a vehicle impact. For example, in response to receiving the signals from the impact detection sensors 78, the controller 76 may initiate the ignition of the pyrotechnic actuator 52. In other words, when the impact detection sensors 78 detect a vehicle impact, the controller 76 may send a signal to ignite the pyrotechnic actuator 52. In this situation, the pyrotechnic actuator 52 discharges, which rotates the armrest 18 to the deployed position and thus rotating the swing bar 20 to the downward position.

The controller 76 may be programmed to prevent actuation of the pyrotechnic actuator 52 based on a position of the armrest 18. For example, in response to receiving signals from the armrest position sensor 80, the controller 76 can determine whether the armrest 18 is in the deployed position or the undeployed position. When the armrest 18 is in the deployed position, the controller 76 may, for example, send a signal to prevent ignition of the pyrotechnic actuator 52. Alternatively, the controller 76 may not send a signal to the pyrotechnic actuator 52 upon determining the armrest 18 is in the deployed position. Conversely, when the armrest 18 is in the undeployed position, the controller 76 may, for example, send a signal to ignite the pyrotechnic actuator 52 in response to detecting a vehicle impact, as set forth above.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java™ Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the armrest 18 may be rotatable, e.g., manually, between the undeployed position and the deployed position. In the event of a vehicle impact, the impact detection sensors 78 detect the impact. The impact detection sensors 78 transmit a signal indicating the vehicle impact collision through the communication network 82 to the controller 76. Additionally, the armrest position sensors 80 may transmit a signal through the communication network 82 to the controller 76 indicating a position of the armrest 18. When the armrest 18 is in the undeployed position and the vehicle impact is detected, the controller 76 transmits a signal through the communication network 82 triggering the pyrotechnic actuator 52 to discharge and rotate the armrest 18 to the deployed position. When the armrest 18 rotates to the deployed position, the swing bar 20 rotates to the downward position. As the occupant moves relative to the seat 14 due to momentum of the vehicle impact, the occupant moves towards the armrest 18 in the deployed position. When the occupant impacts the armrest 18, the armrest 18 controls the kinematics of the occupant. By rotating the swing bar 20 to the downward position when the armrest 18 rotates to the deployed position, the swing bar 20 may provide additional lateral support to the armrest 18, which may increase the likelihood that the armrest 18 controls the kinematics of the occupant regardless of whether another component is adjacent to the seat 14 to provide lateral support to the occupant.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A seat comprising:
  a seatback;
  an armrest supported by the seatback and rotatable relative to the seatback to a deployed position;
  a swing bar supported by the armrest and rotatable relative to the armrest to a downward position, the swing bar in the downward position being elongated downwardly from the armrest; and
  a drive belt indexed with the armrest and the swing bar to rotate the swing bar to the downward position when the armrest rotates to the deployed position.

2. The seat of claim 1, further comprising a first gear fixed to the armrest and a second gear fixed to the swing bar, the drive belt being toothed and engaged with the first gear and the second gear.

3. The seat of claim 2, wherein the drive belt is endless and extends around the first gear and the second gear.

4. The seat of claim 2, further comprising a pyrotechnic actuator supported by the seatback and engaged with the armrest, wherein the pyrotechnic actuator is configured to rotate the armrest to the deployed position.

5. The seat of claim 1, further comprising a first joint between the armrest and the seatback and a second joint between the armrest and the swing bar, wherein the drive belt is engaged with the first joint and the second joint.

6. The seat of claim 5, wherein the second joint is spaced from the first joint along the armrest.

7. The seat of claim 5, wherein the armrest is rotatable in a direction about the first joint, and the swing bar is rotatable in the direction about the second joint.

8. The seat of claim 5, wherein the drive belt is endless and extends around the first and second joints.

9. The seat of claim 1, further comprising a pyrotechnic actuator supported by the seatback and engaged with the armrest, wherein the pyrotechnic actuator is configured to rotate the armrest to the deployed position.

10. The seat of claim 9, further comprising a processor and a memory storing instructions to actuate the pyrotechnic actuator in response to detecting a vehicle impact.

11. The seat of claim 10, wherein the instructions further include instructions to prevent actuation of the pyrotechnic actuator in response to detecting the armrest in the deployed position.

12. The seat of claim 1, wherein the swing bar is housed in the armrest in a raised position.

13. The seat of claim 1, further comprising a seat bottom extending from the seatback, wherein the swing bar in the downward position extends from the armrest towards the seat bottom.

14. The seat of claim 13, wherein the seat bottom includes a bracket, the swing bar in the downward position being engaged with the bracket.

15. The seat of claim 1, wherein the armrest extends along the seatback in an undeployed position and transverse to the seatback in the deployed position.

16. The seat of claim 1, wherein the swing bar extends along the armrest in a raised position when the armrest is in an undeployed position.

17. The seat of claim 1, further comprising a panel extending from the armrest to the swing bar.

18. The seat of claim 17, wherein the panel is attached to the swing bar and the armrest, the panel being under tension when the swing bar is in the downward position.

19. The seat of claim 17, wherein the panel is uninflatable.

20. The seat of claim 17, wherein the panel is fabric.

* * * * *